United States Patent
Ho et al.

(10) Patent No.: US 9,554,417 B2
(45) Date of Patent: Jan. 24, 2017

(54) OPTIMIZED HEADER FOR EFFICIENT PROCESSING OF DATA PACKETS

(75) Inventors: Sai Yiu Duncan Ho, San Diego, CA (US); Shailesh Maheshwari, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 851 days.

(21) Appl. No.: 12/643,855

(22) Filed: Dec. 21, 2009

(65) Prior Publication Data

US 2010/0157904 A1 Jun. 24, 2010

Related U.S. Application Data

(60) Provisional application No. 61/140,788, filed on Dec. 24, 2008.

(51) Int. Cl.
*H04J 3/24* (2006.01)
*H04W 80/02* (2009.01)
*H04W 12/02* (2009.01)

(52) U.S. Cl.
CPC ............. *H04W 80/02* (2013.01); *H04W 12/02* (2013.01)

(58) Field of Classification Search
CPC ............................. H04W 80/02; H04W 12/02
See application file for complete search history.

(56) References Cited

U.S. PATENT DOCUMENTS

| | | | | |
|---|---|---|---|---|
| 6,961,349 | B2* | 11/2005 | Malomsoky et al. | 370/469 |
| 2002/0126629 | A1* | 9/2002 | Jiang et al. | 370/328 |
| 2006/0050679 | A1* | 3/2006 | Jiang | 370/350 |
| 2008/0056148 | A1* | 3/2008 | Wu | 370/252 |
| 2008/0226074 | A1* | 9/2008 | Sammour et al. | 380/270 |
| 2008/0273537 | A1 | 11/2008 | Meylan et al. | |

(Continued)

FOREIGN PATENT DOCUMENTS

| | | |
|---|---|---|
| CN | 101061686 A | 10/2007 |
| CN | 101268673 A | 9/2008 |

(Continued)

OTHER PUBLICATIONS

Alcatel-Lucent: "Comparison of different SN handling at Layer 2" 3GPP Draft; R2-073455 Comparison of Different SN Handling at Layer 2, SRD Generation Partnership Project (3GPP), Mobile Competence Centre ; 650, Route Des Lucioles ; F-06921 Sophia-Antipolis Cedex ; France, vol. RAN WG2, no. Athens, Greece; Aug. 15, 2007, Aug. 15, 2007 (Aug. 15, 2007), XP050136160 [retrieved on Aug. 15, 2007] p. 1-p. 2 p. 5-p. 6.

(Continued)

*Primary Examiner* — Phuc Tran
(74) *Attorney, Agent, or Firm* — Ke Liu

(57) ABSTRACT

Methods, apparatus, and computer program products for processing an RLC PDU having an RLC payload and an RLC header, wherein the RLC payload comprises a plurality of at least partially ciphered SDUs, each of the SDUs being either a partial or complete SDU, and wherein the RLC header comprises a separate count for each of the SDUs, each of the counts being configured to support deciphering of the corresponding SDU. Each SDU is a PDCP PDU having a PDCP payload and a PDCP header, wherein the PDCP payload comprises a plurality of IP packets, and wherein the PDCP header comprises a length indicator for at least one of the IP packets.

33 Claims, 13 Drawing Sheets

(56) References Cited

U.S. PATENT DOCUMENTS

2008/0310452 A1* 12/2008 Vedantham et al. .......... 370/474
2011/0044225 A1* 2/2011 Rinne et al. .................. 370/312

FOREIGN PATENT DOCUMENTS

| JP | 2010508754 A | 3/2010 |
|----|--------------|--------|
| JP | 2010520698 A | 6/2010 |
| WO | 2008084992 A1 | 7/2008 |
| WO | 2008114993 A1 | 9/2008 |
| WO | WO2008137962 | 11/2008 |

OTHER PUBLICATIONS

Ericsson: "L2 Sequence Number in LTE," 3GPP Draft; R2-071837, 3rd Generation Partnership Project (3GPP), Mobile Competence Centre, May 4, 2007.
International Search Report and Written Opinion—PCT/US2009/069314, International Search Authority—European Patent Office—Aug. 13, 2010.
Partial International Search Report—PCT/US2009/069314—International Search Authority—European Patent Office, May 11, 2010.
3rd Generation Partnership Project; Technical Specification Group Radio Access Network; Evolved Universal Terrestrial Radio Access (E-UTRA); Packet Data Convergence Protocol (PDCP) specification (Release 8), 3GPP TS 36.323 V8.3.0 (Sep. 2008).
QUALCOMM Europe,Processing-Efficient RLC Headers for High Rates,3GPP TSG-RAN WG2 Meeting #66 R2-093155,May 4, 2009.
Taiwan Search Report—TW098144797—TIPO—Dec. 4, 2012.

* cited by examiner

OPTIMIZED HEADER FOR EFFICIENT PROCESSING OF DATA PACKETS

CROSS-REFERENCE TO RELATED APPLICATION(S)

Pursuant to 35 U.S.C. §119(e), this application claims the benefit of U.S. Provisional Application Ser. No. 61/140,788, filed on Dec. 24, 2008, the contents of which is hereby incorporated by reference herein in its entirety.

BACKGROUND

Field

The present disclosure relates generally to communication systems, and more particularly, to methods and apparatus to optimize headers for efficient processing of data packets.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink, SC-FDMA on the uplink, and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In one aspect of the disclosure, an apparatus for wireless communications includes a processing system configured to process a protocol data unit (PDU) having a payload and a header, wherein the payload comprises a plurality of at least partially ciphered service data units (SDU)s, each of the SDUs being either a partial or complete SDU, and wherein the header comprises a separate count for each of the SDUs, each of the counts being configured to support deciphering of the corresponding SDU.

In another aspect of the disclosure, an apparatus for wireless communications includes a processing system configured to process a packet data convergence protocol (PDCP) PDU having a PDCP payload and a PDCP header, wherein the PDCP payload comprises a plurality of SDUs, and wherein the PDCP header comprises a length indicator for at least one of the SDUs.

In yet another aspect of the disclosure, an apparatus for wireless communication includes a processing system configured to process a radio link control (RLC) PDU having an RLC payload and an RLC header, wherein the RLC payload comprises a plurality of at least partially ciphered PDCP PDUs, each of the PDCP PDUs being either a partial or complete PDCP PDU. The RLC header includes a sequence number for at least one of the PDCP PDUs, a separate offset for at least each of the partial PDCP PDUs, each of the offsets being configured to support deciphering of the corresponding PDCP PDU, wherein the offset for each of the partial PDCP PDUs is related to the segmentation of the partial PDCP PDU between the RLC PDU and at least another RLC PDU, a separate count for each of the PDCP PDUs, each of the counts being configured to support deciphering of the corresponding PDCP PDU, wherein each of the counts comprises a hyper-frame number and a sequence number for the corresponding PDCP PDU, an indication that the PDCP PDUs are ciphered and that the count for each of the PDCP PDUs is included in the header, and a length indicator for at least one of the PDCP PDUs.

In a further aspect of the disclosure, an apparatus for wireless communications includes a processing system configured to process a PDCP PDU having a PDCP payload and a PDCP header, wherein the PDCP payload comprises a plurality of IP packets, and wherein the PDCP header includes a length indicator for at least one of the IP packets, and a sequence number for only one of the IP packets in the PDCP payload.

In yet a further aspect of the disclosure, an apparatus for wireless communications includes means for generating a payload comprising a plurality of at least partially ciphered SDUs, each of the SDUs being either a partial or complete SDU, means for generating a header comprising a separate count for each of the SDUs, each of the counts being configured to support deciphering of the corresponding SDU, and means for generating a PDU by attaching the header to the payload.

In another aspect of the disclosure, an apparatus for wireless communications includes means for receiving a PDU having a payload and a header, wherein the payload comprises a plurality of at least partially ciphered SDUs, each of the SDUs being either a partial or complete SDU, and wherein the header comprises a separate count for each of the SDUs, each of the counts being configured to support deciphering of the corresponding SDU, and means for using the counts in the header to decipher the SDUs.

In yet another aspect of the disclosure, an apparatus for wireless communications includes means for generating a PDCP payload comprising a plurality of SDUs, means for generating a PDCP header comprising a length indicator for at least one of the SDUs, means for generating a PDCP PDU by attaching the PDCP header to the PDCP payload.

In a further aspect of the disclosure, an apparatus for wireless communications includes means for receiving a PDCP PDU having a PDCP payload and a PDCP header, wherein the PDCP payload comprises a plurality of SDUs, and wherein the PDCP header comprises a length indicator for at least one of the SDUs, and means for using the PDCP header in the PDU to recover the SDUs in the PDCP payload.

In yet a further aspect of the disclosure, a method for wireless communications includes generating a payload comprising a plurality of at least partially ciphered SDUs, each of the SDUs being either a partial or complete SDU, generating a header comprising a separate count for each of the SDUs, each of the counts being configured to support deciphering of the corresponding SDU, and generating a PDU by attaching the header to the payload.

In another aspect of the disclosure, a method for wireless communications includes receiving a PDU having a payload and a header, wherein the payload comprises a plurality of at least partially ciphered SDUs, each of the SDUs being either a partial or complete SDU, and wherein the header comprises a separate count for each of the SDUs, each of the counts being configured to support deciphering of the corresponding SDU, and using the counts in the header to decipher the SDUs.

In yet another aspect of the disclosure, a method for wireless communications includes processing a PDU having a payload and a header, wherein the payload comprises a plurality of at least partially ciphered SDUs, each of the SDUs being either a partial or complete SDU, and wherein the header comprises a separate count for each of the SDUs, each of the counts being configured to support deciphering of the corresponding SDU.

In a further aspect of the disclosure, method for wireless communications includes processing a PDCP PDU having a PDCP payload and a PDCP header, wherein the PDCP payload comprises a plurality of SDUs, and wherein the PDCP header comprises a length indicator for at least one of the SDUs.

In yet a further aspect of the disclosure, a computer product includes a computer readable medium having code for processing a PDU having a payload and a header, wherein the payload comprises a plurality of at least partially ciphered SDUs, each of the SDUs being either a partial or complete SDU, and wherein the header comprises a separate count for each of the SDUs, each of the counts being configured to support deciphering of the corresponding SDU.

In another aspect of the disclosure, a computer product includes a computer readable medium having code for processing a PDCP PDU having a PDCP payload and a PDCP header, wherein the PDCP payload comprises a plurality of SDUs, and wherein the PDCP header comprises a length indicator for at least one of the SDUs.

DETAILED DESCRIPTION

Figure 1:
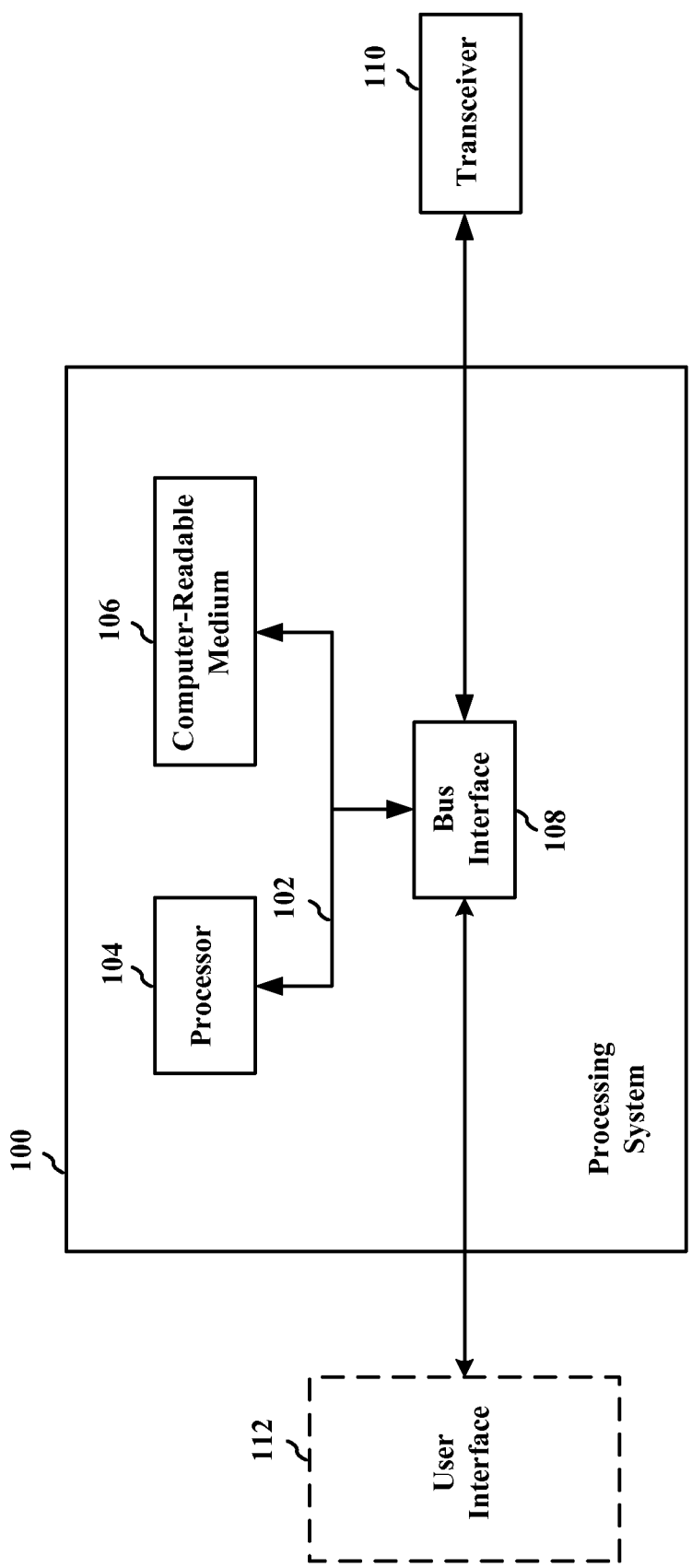
FIG. 1 is a conceptual diagram illustrating an example of a hardware implementation for an apparatus employing a processing system.

The detailed description set forth below, in connection with the appended drawings, is intended as a description of various configurations and is not intended to represent the sole configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software, depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. A computer-readable medium may include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, a carrier wave, a transmission line, or any other suitable medium for storing or transmitting software. The computer-readable medium may be resident in the processing system, external to the processing system, or distributed across multiple entities including the processing system. Computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

FIG. 1 is a conceptual diagram illustrating an example of a hardware implementation for an apparatus employing a processing system. In this example, the processing system 100 may be implemented with a bus architecture, represented generally by the bus 102. The bus 102 may include any number of interconnecting buses and bridges depending on the specific application of the processing system 100 and the overall design constraints. The bus 102 links together various circuits including one or more processors, represented generally by the processor 104, and computer-readable media, represented generally by computer-readable medium 106. The bus 102 may also link various other circuits such as timing sources, peripherals, voltage regulators, power management circuits, and the like, which are well known in the art, and therefore, will not be described any further. A bus interface 108 provides an interface between the bus 102 and a transceiver 110. The transceiver 110 provides a means for communicating with various other apparatus over a transmission medium. Depending upon the nature of the apparatus, a user interface 112 (e.g., keypad, display, speaker, microphone, joystick) may also be provided.

The processor 104 is responsible for managing the bus and general processing, including the execution of software stored on the computer-readable medium 106. The software, when executed by the processor 104, cause the processing system 100 to perform the various functions described below for any particular apparatus. The computer-readable medium 106 may also be used for storing data that is manipulated by the processor 104 when executing software.

Figure 2:
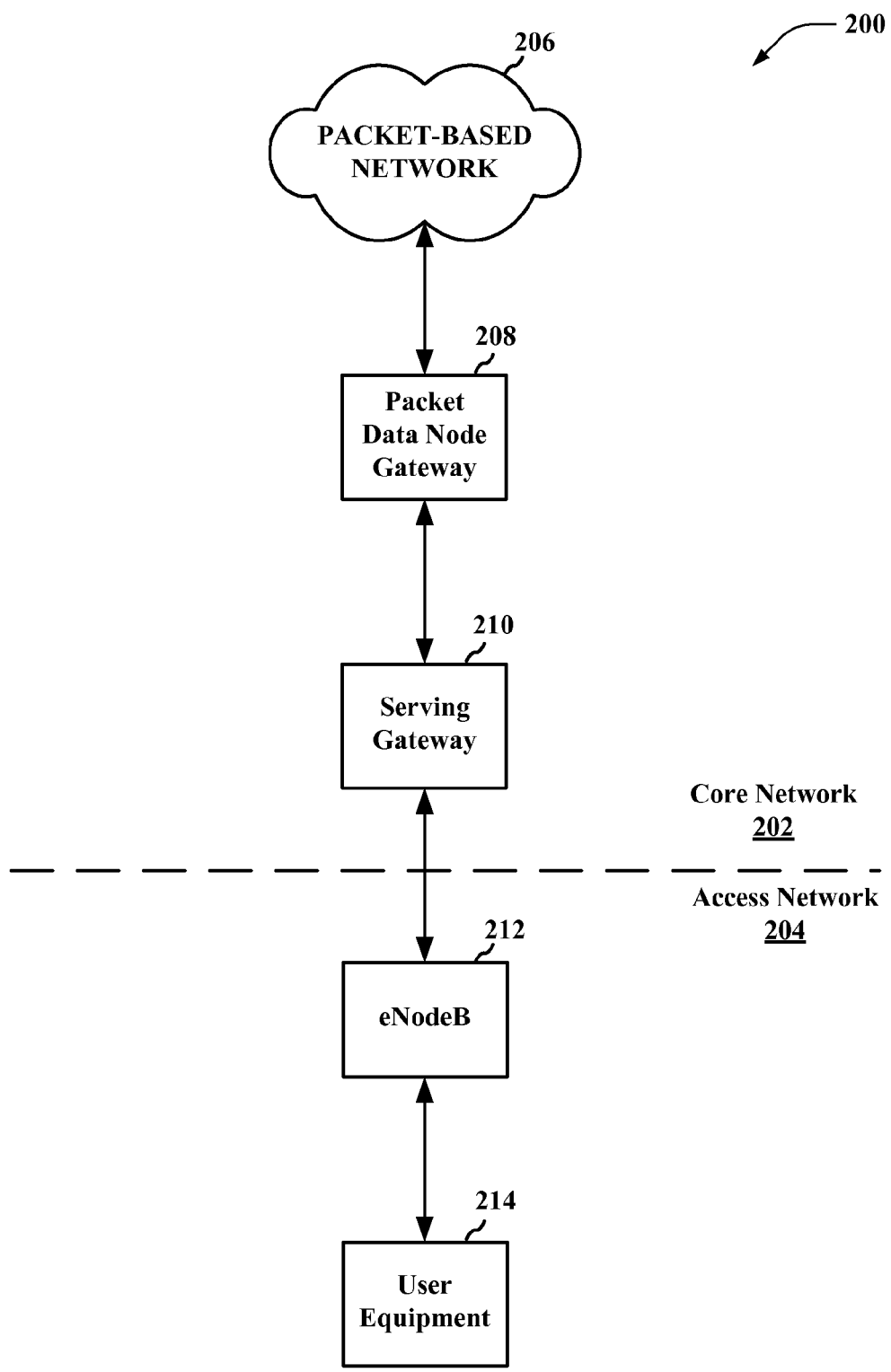
FIG. 2 is a conceptual diagram illustrating an example of a network architecture.

An example of a telecommunications system employing various apparatus will now be presented with reference to an LTE network architecture as shown in FIG. 2. The LTE network architecture 200 is shown with a core network 202 and an access network 204. In this example, the core network 202 provides packet-switched services to the access network 204, however, as those skilled in the art will readily appreciate, the various concepts presented throughout this disclosure may be extended to core networks providing circuit-switched services.

The access network 204 is shown with a single apparatus 212, which is commonly referred to as an evolved NodeB in LTE applications, but may also be referred to by those skilled in the art as a base station, a base transceiver station, a radio base station, a radio transceiver, a transceiver function, a basic service set (BSS), an extended service set (ESS), or some other suitable terminology. The eNodeB 212 provides an access point to the core network 202 for a mobile apparatus 214. Examples of a mobile apparatus include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The mobile apparatus 214 is commonly referred to as user equipment (UE) in LTE applications, but may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The core network 202 is shown with several apparatus including a packet data node (PDN) gateway 208 and a serving gateway 210. The PDN gateway 210 provides a connection for the access network 204 to a packet-based network 206. In this example, the packet-based network 206 is the Internet, but the concepts presented throughout this disclosure are not limited to Internet applications. The primary function of the PDN gateway 208 is to provide the UE 214 with network connectivity. Data packets are transferred between the PDN gateway 208 and the UE 214 through the serving gateway 210, which serves as the local mobility anchor as the UE 214 roams through the access network 204.

Figure 3:
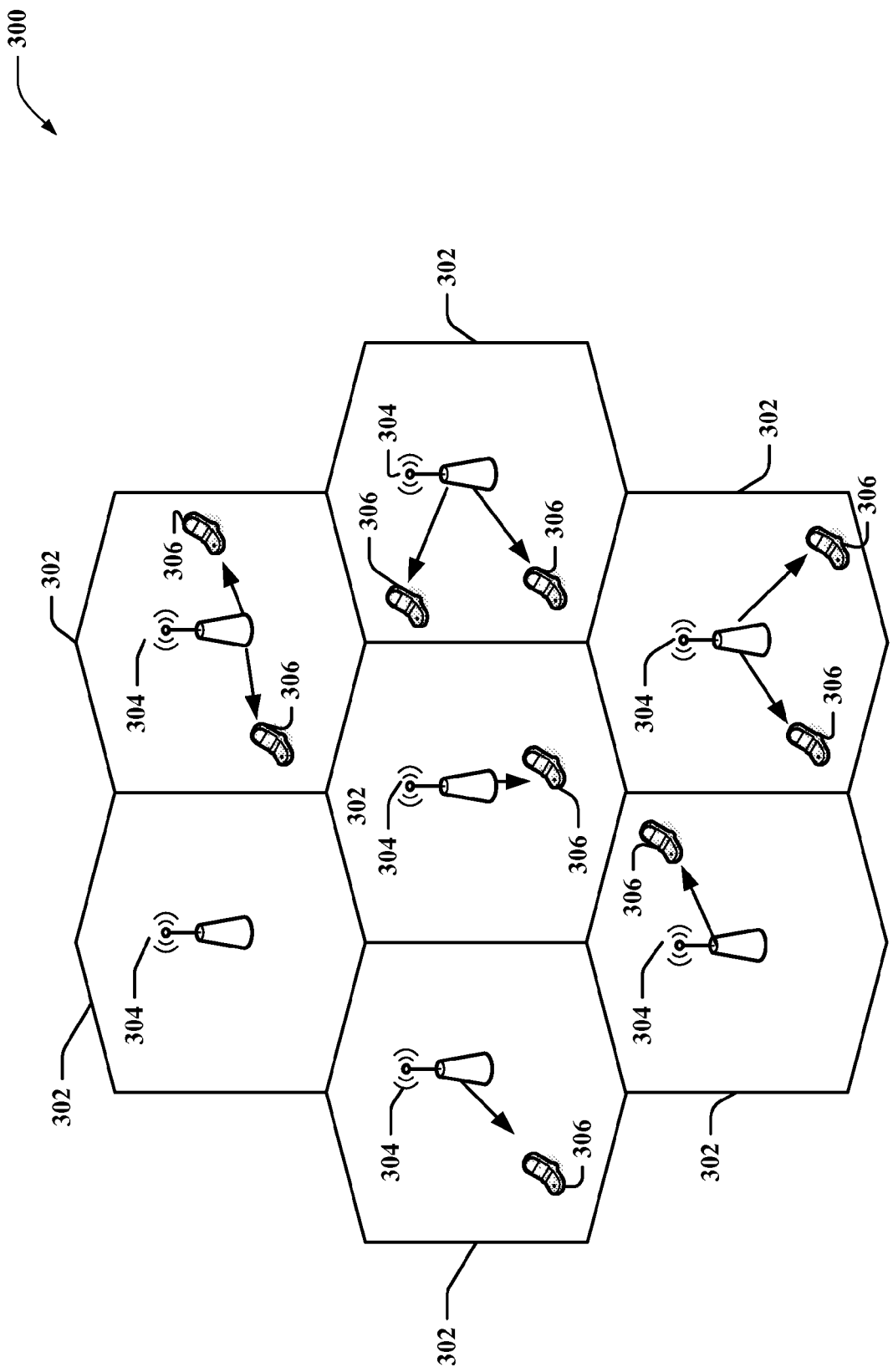
FIG. 3 is a conceptual diagram illustrating an example of an access network.

An example of an access network in an LTE network architecture will now be presented with reference to FIG. 3. In this example, the access network 300 is divided into a number of cellular regions (cells) 302. An eNodeB 304 is assigned to each cell 302 and is configured to provide an access point to a core network 202 (see FIG. 2) for all the UEs 306 in the cell 302. There is no centralized controller in this example of an access network 300, but a centralized controller may be used in alternative configurations. The eNodeB 304 is responsible for all radio related functions including radio bearer control, admission control, mobility control, scheduling, security, and connectivity to the serving gateway 210 in the core network 202 (see FIG. 2).

The modulation and multiple access scheme employed by the access network 300 may vary depending on the particular telecommunications standard being deployed. In LTE applications, OFDM is used on the downlink and SC-FDMA is used on the uplink to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNodeB 304 may have multiple antennas supporting MIMO technology. The use of MIMO technology enables the eNodeB 304 to exploit the spatial domain to support spatial multiplexing, beamforming, and transmit diversity.

Spatial multiplexing may be used to transmit different streams of data simultaneously on the same frequency. The data streams may be transmitted to a single UE 306 to increase the data rate or to multiple UEs 306 to increase the overall system capacity. This is achieved by spatially precoding each data stream and then transmitting each spatially precoded stream through a different transmit antenna on the downlink. The spatially precoded data streams arrive at the UE(s) 306 with different spatial signatures, which enables each of the UE(s) 306 to recover the one or more data streams destined for that UE 306. On the uplink, each UE 306 transmits a spatially precoded data stream, which enables the eNodeB 304 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell 302, a single stream beamforming transmission may be used in combination with transmit diversity.

In the detailed description that follows, various aspects of an access network will be described with reference to a MIMO system supporting OFDM on the downlink. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The uplink may use SC-FDMA in the form of a DFT-spread OFDM signal to compensate for high peak-to-average power ratio (PARR).

Figure 4:
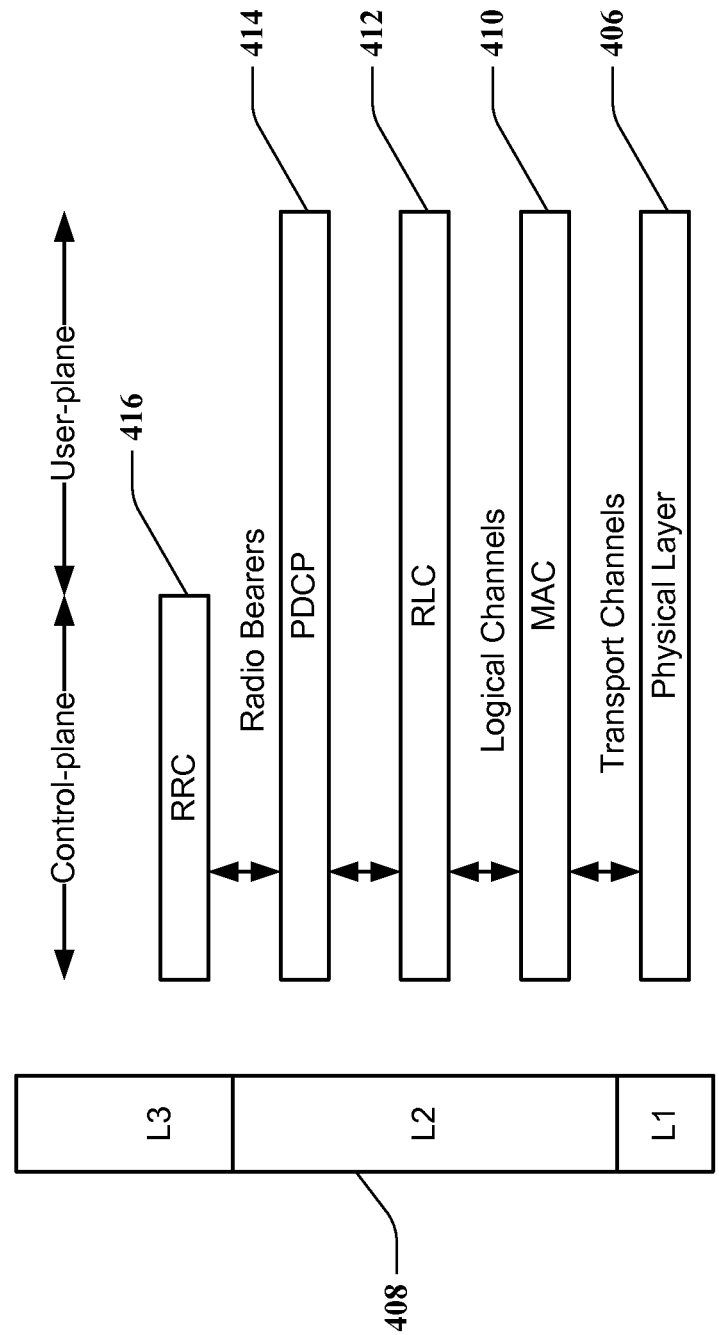
FIG. 4 is a conceptual diagram illustrating an example of a radio protocol architecture for the user and control plane.

The radio protocol architecture may take on various forms depending on the particular application. An example for an LTE system will now be presented with reference to FIG. 4. FIG. 4 is a conceptual diagram illustrating an example of the radio protocol architecture for the user and control planes.

Turning to FIG. 4, the radio protocol architecture for the UE and eNodeB is shown with three layers: Layer 1, Layer 2, and Layer 3. Layer 1 is the lowest layer and implements various physical layer signal processing functions. Layer 1 will be referred to herein as the physical layer 406. Layer 2 (L2 layer) 408 is above the physical layer 406 and is responsible for the link between the UE and eNodeB over the physical layer 406.

In the user plane, the L2 layer 408 includes a media access control (MAC) sublayer 410, a radio link control (RLC) sublayer 412, and a packet data convergence protocol (PDCP) 414 sublayer, which are terminated at the eNodeB on the network side. Although not shown, the UE may have several upper layers above the L2 layer 408 including a network or IP layer that is terminated at the PDN gateway 208 (see FIG. 2) on the network side and an application layer that is terminated at the connection end (e.g., far end UE, server, etc.).

The PDCP sublayer 414 provides multiplexing between different radio bearers and logical channels. The PDCP sublayer 414 also provides header compression for upper layer data packets to reduce radio transmission overhead, security by ciphering the data packets, and handover support for UEs between eNodeBs. The RLC sublayer 412 provides segmentation and reassembly of upper layer data packets, retransmission of lost data packets, and reordering of data packets to compensate for out-of-order reception due to Hybrid Automatic Repeat reQuest (HARQ). The MAC sublayer 410 provides multiplexing between logical and transport channels. The MAC sublayer 410 is also responsible for allocating the various radio resources in one cell among the UEs. The MAC sublayer 410 is also responsible for HARQ operations.

In the control plane, the radio protocol architecture for the UE and eNodeB is substantially the same for the physical layer 406 and the L2 layer 408 with the exception that there is no header compression function for the control plane. The control plane also includes a radio resource control (RRC) sublayer 416 in Layer 3. The RRC sublayer 416 is responsible for obtaining radio resources (i.e., radio bearers) and for configuring the lower layers using RRC signaling between the eNodeB and the UE.

Figure 5:
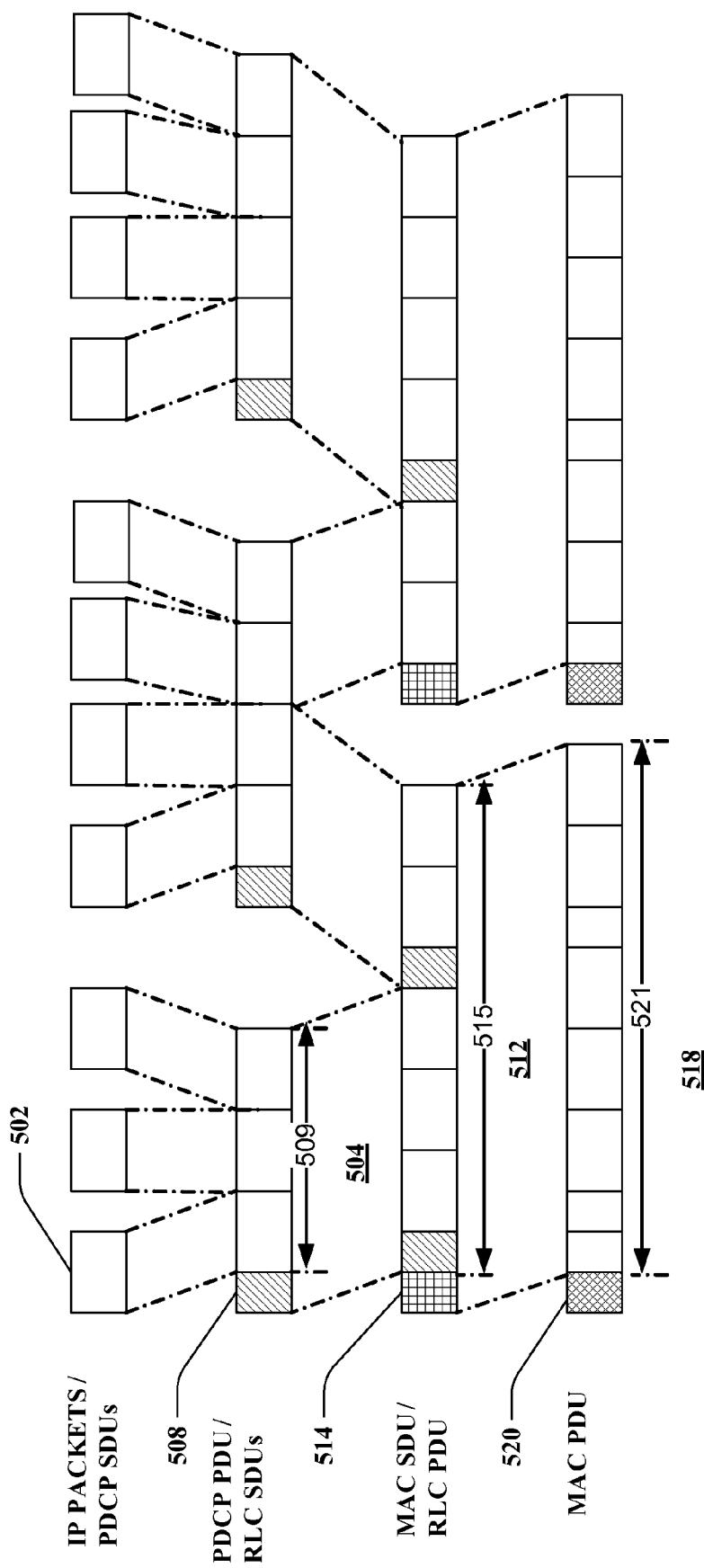
FIG. 5 is a conceptual diagram illustrating an example of upper data packets being processed through the L2 layer.

FIG. 5 is a conceptual diagram illustrating an example of upper data packets being processed through the L2 layer. The term "processed" is intended to include both (1) the generation of MAC protocol data units (PDUs) from upper layer data packets (e.g., IP packets) on the transmit side, and (2) the recovery of upper layer data packets from MAC PDUs on the receive side. As a matter of convention, on the transmit side, a layer in the protocol stack receives service data units (SDUs) from an upper layer and processes the SDUs to produce PDUs for delivery to a lower layer. On the receive side, a layer in a protocol stack receives PDUs from a lower layer and processes the PDUs to recover SDUs for delivery to an upper.

When the apparatus (e.g., eNodeB or UE) is in a transmit mode, upper layer packets may be provided to the PDCP sublayer in the form of PDCP SDUs 502. The PDCP sublayer assembles the PDCP SDUs 502 into PDCP PDUs 504. Each PDCP PDU 504 includes a PDCP header 508 and a PDCP payload 509. The PDCP payload 509 may be used to carry PDCP SDUs 502. In this example, the PDCP payload 509 for each PDCP PDU 504 includes three PDCP SDUs 502. The PDCP PDUs 504 may then be provided to the RLC sublayer.

At the RLC sublayer, the PDCP PDUs 504, or RLC SDUs, are assembled into RLC PDUs 512. Each RLC PDU 512 includes an RLC header 514 and an RLC payload 515. The RLC payload 515 may be used to carry RLC SDUs 504. In this example, the RLC SDUs 510 may be fragmented to enable three RLC SDUs 504 to be assembled into the payloads 515 for two PLC PDUs 512. The RLC PDUs 512 may then be provided to the MAC sublayer.

At the MAC sublayer, the RLC PDUs 512, or MAC SDUs, are assembled into MAC PDUs 518. Each MAC PDU 518 includes a MAC header 520 and a MAC payload 521. The MAC payload 521 may be used to carry RLC SDUs 504. In this example, the MAC payload 521 for each MAC PDU 518 includes one MAC SDU 512. The MAC PDUs 518 may then be provided to the physical layer (not shown).

When the apparatus is in the receive mode, the process described above is reversed.

Figure 6:
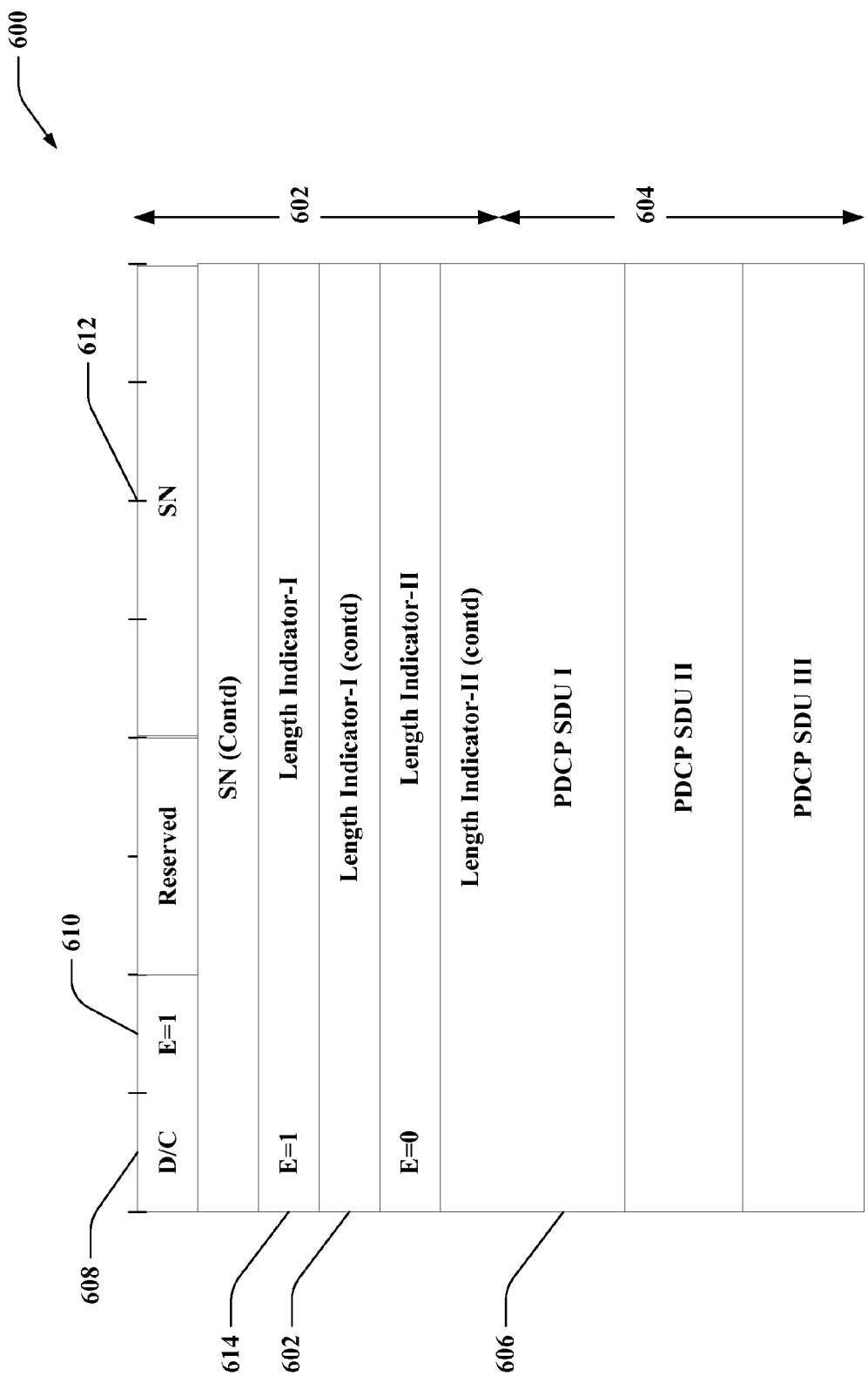
FIG. 6 is a conceptual diagram illustrating an example of a PDCP PDU.

FIG. 6 is a conceptual diagram illustrating an example of a PDCP PDU. In the example, a PDCP PDU 600 includes a PDCP header 602 and a PDCP payload 604. The PDCP payload 604 includes three PDCP SDUs 606. The PDCP header 602 includes a data/control (D/C) field 608 that indicates whether the PDCP PDU 600 is a PDU in the user or control plane. The header 602 also includes a serial number (SN) field 612 which indicates the SN for the first PDCP SDU 606 in the payload 604. The header 602 further includes a first length indicator (LI) field 614 which indicates the size of the first PDCP SDU 606 in the payload 604, and a second LI field 614 which indicates the size of the second PDCP SDU 606 in the payload 604. Multiple E field 610 may also be included in the header 602, one E field corresponding to one PDCP SDU. If the E field 610 is set, then an LI indicator 614 is present for the corresponding PDCP SDU 606. If the E field 610 is not set, then the corresponding PDCP SDU 606 is the last SDU in the payload 604.

Figure 7:
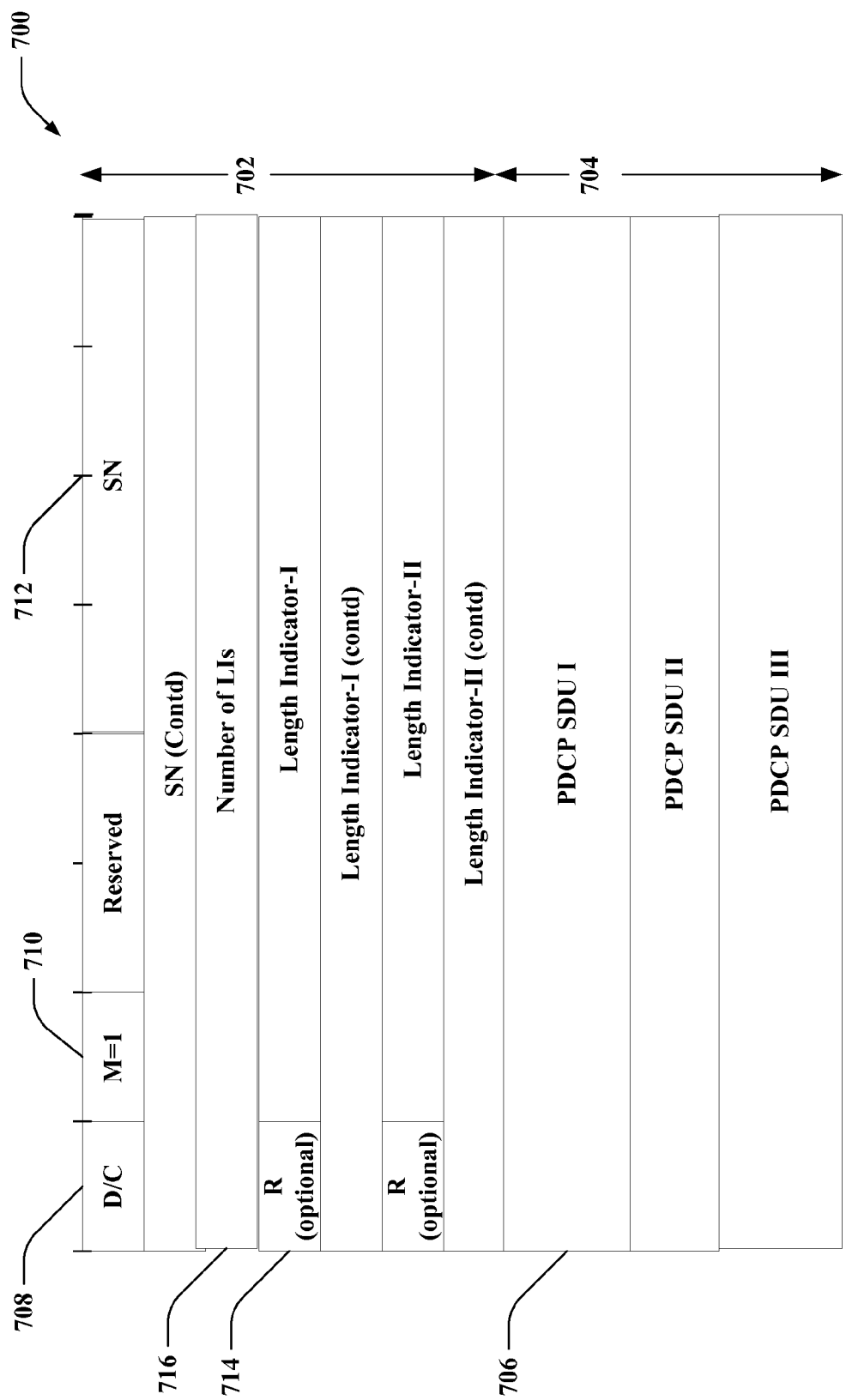
FIG. 7 is a conceptual diagram illustrating another example of a PDCP PDU.

FIG. 7 is a conceptual diagram illustrating another example of a PDCP PDU. This example is similar to that described in connection with FIG. 7. A PDCP PDU 700 includes a PDCP header 702 and a PDCP payload 704. The PDCP payload 704 includes three PDCP SDUs 706. The PDCP header 702 includes a data/control (D/C) field 708 that indicates whether the PDCP PDU 700 is a PDU in the user or control plane. The header 702 also includes a SN field 712 which indicates the SN for the first PDCP SDU 706 in the payload 704. The header 702 further includes a first LI field 714 which indicates the size of the first PDCP SDU 706 in the payload 704, and a second LI field 714 which indicates the size of the second PDCP SDU 706 in the payload 704. The primary difference is that an M field 710 and an LI number field 716 is used instead of multiple E fields. If the M field 710 is set, then the PDCP PDU 700 includes multiple PDCP SDUs. If the M field 710 is not set, then the PDCP PDU 700 includes one PDCP SDU. Assuming the former, the LI number field 716 is used to indicate the number LI fields 716 in the header 702. The number of LI fields is equal to the number of PDCP SDUs 706 minus one. With this approach, the receiver can identify the total length of the PDCP header including the LI field to find the beginning of the payload. This allows the receiver to process each LI field only once.

In both examples presented above, the need to add PDCP SNs between the SDUs is eliminated. The complete PDCP header is at the beginning of the PDCP PDU, thereby eliminating the need to parse the PDCP header to compute the start for each SDU.

Figure 8:
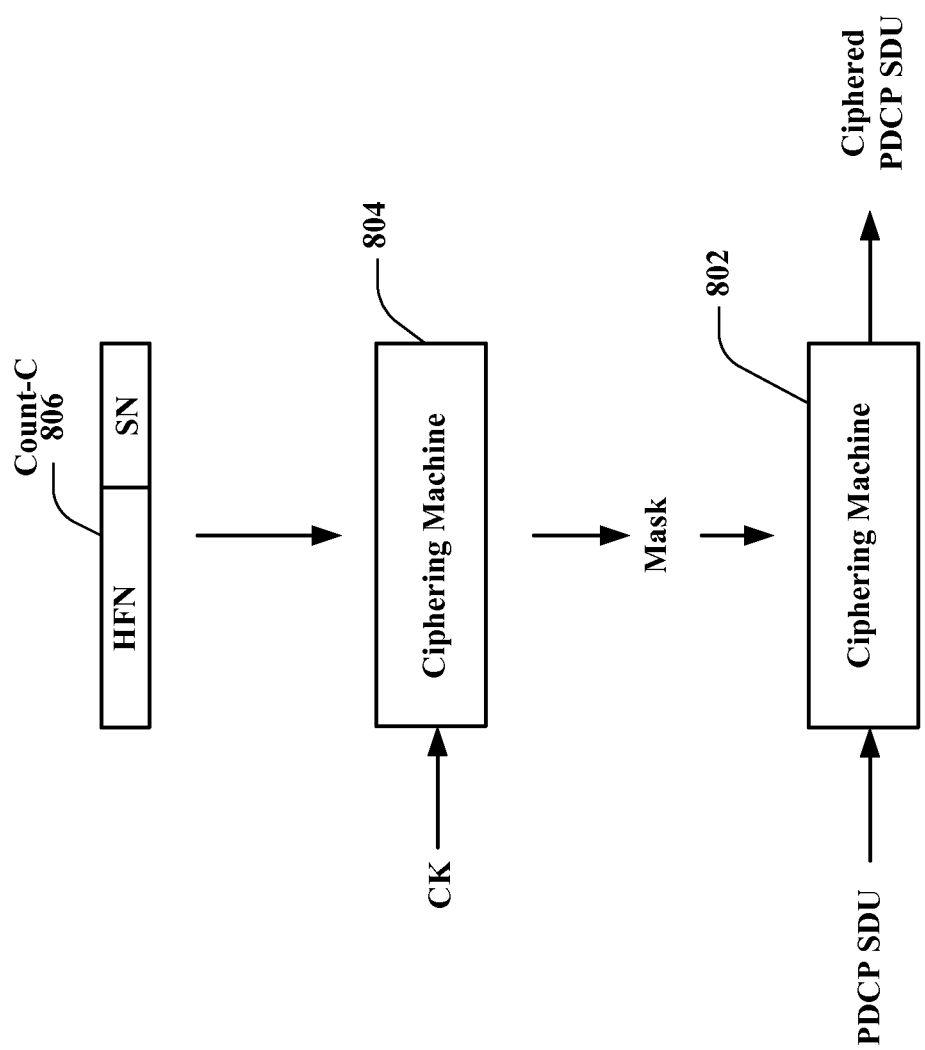
FIG. 8 is a conceptual diagram illustrating the ciphering functionality of the PDCP sublayer.

As discussed earlier, the PDCP sublayer performs a ciphering function. An example of a ciphering algorithm will now be presented with reference to FIG. 8. In this example, ciphering is performed by a ciphering machine 802 between a mask and each PDCP SDU in the payload. The mask is generated by running a ciphering sequence number (Count-C) 806 through another ciphering machine 804 using a ciphering key (CK). The Count-C 806 includes a long sequence number (referred to as a Hyper Frame Number (HFN)) and the SN for the SDU being ciphered. Re-ordering at the PDCP sublayer is based on Count-C 806 and forwarding is base on the PDCP SN. The ciphering key is exchanged between the UE and eNodeB when the wireless link is established.

Figure 9:
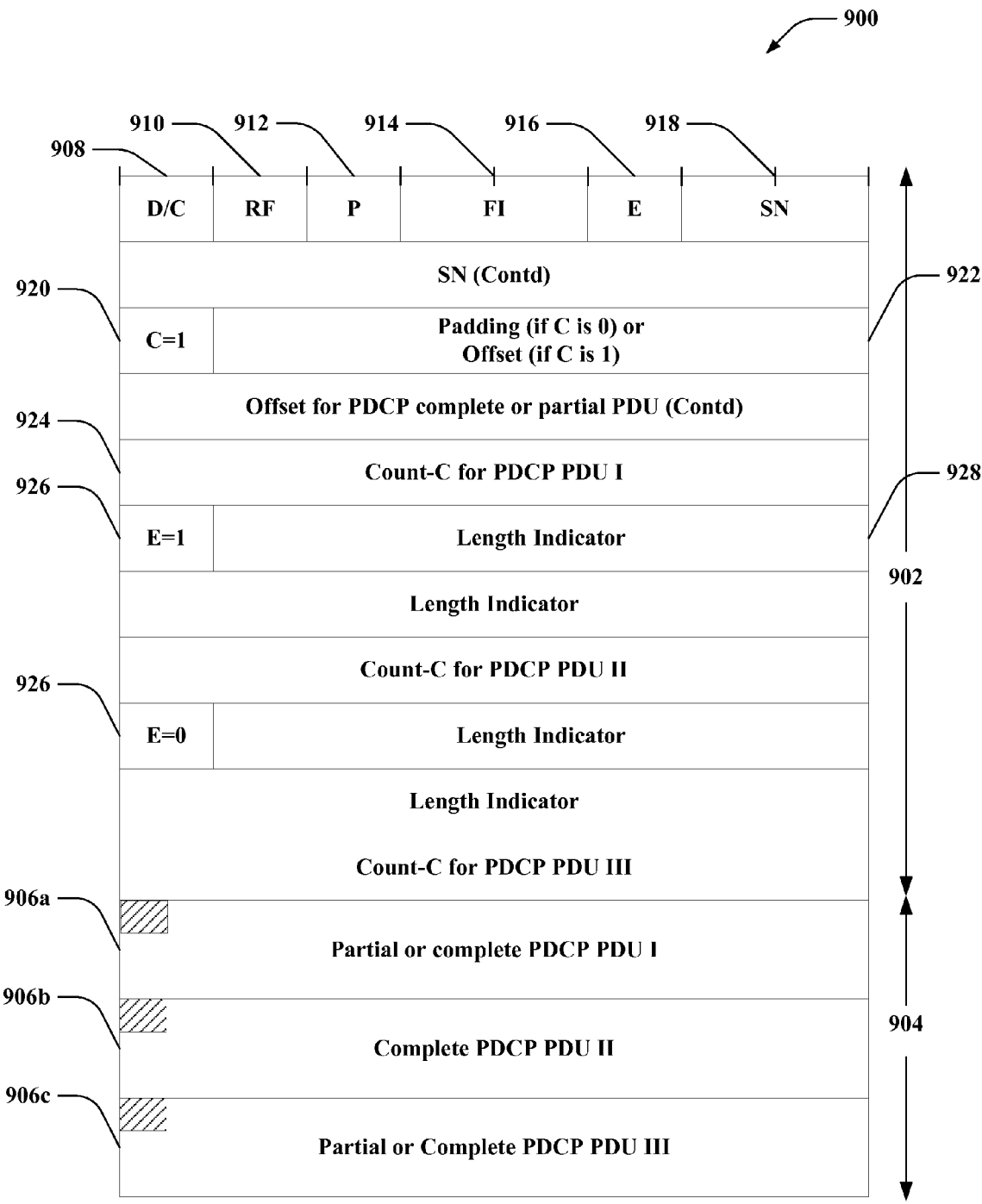
FIG. 9 is a conceptual diagram illustrating an example of an RLC PDU.

FIG. 9 is a conceptual diagram illustrating an example of an RLC PDU. An RLC PDU 900 includes an RLC header 902 and an RLC payload 904. The RLC payload 904 includes a first partial or complete RLC SDU 906a, a second complete RLC SDU 906b, and a third partial or complete RLC SDU 906c. In this example, the RLC header 902 includes the Count-C and an "offset," which will assist the receiver to decipher the PDCP payload on the fly when PDCP PDUs are segmented between the payloads of two RLC PDUs. In other words, the MAC and RLC headers provide sufficient information to decipher the PDCP payload. The offset can be from the beginning of the payload or it can be from a fixed PDCP header from where ciphering needs to be done. In an alternative configuration, the Count-C, but not the offset, is included in the RLC header that provides for deciphering of complete SDUs received in the payload.

The RLC header 902 is shown with a D/C field 908 that indicates whether the RLC PDU 900 is a PDU in the user or control plane, an RF field 910 indicating whether or not the RLC PDU 900 is segmented, a P field 912 indicating whether the transmitting side requests a status report, an FI field 914 indicating whether an RLC SDU is segmented either at the beginning or end of the payload, an E field 916 indicating whether the payload follows, and the SN 918 for the first SDU in the payload 904. The RLC header 902 also includes a C field 920. The C field 920 is set when the SDU 906 in the RLC payload 904 are ciphered. If the C field 920 is set, the offset 922 and the C-Count 924 are also included in the RLC header 902 for the first SDU in the RLC payload 904. The RLC header 902 may also include multiple E fields 926, one E field corresponding to one RLC SDU 916. If the E field 926 is set, then an LI indicator 928 is present for the corresponding RLC SDU 906. If the E field 926 is not set, then the corresponding RLC SDU 906 is the last SDU in the payload 904.

Figure 10:
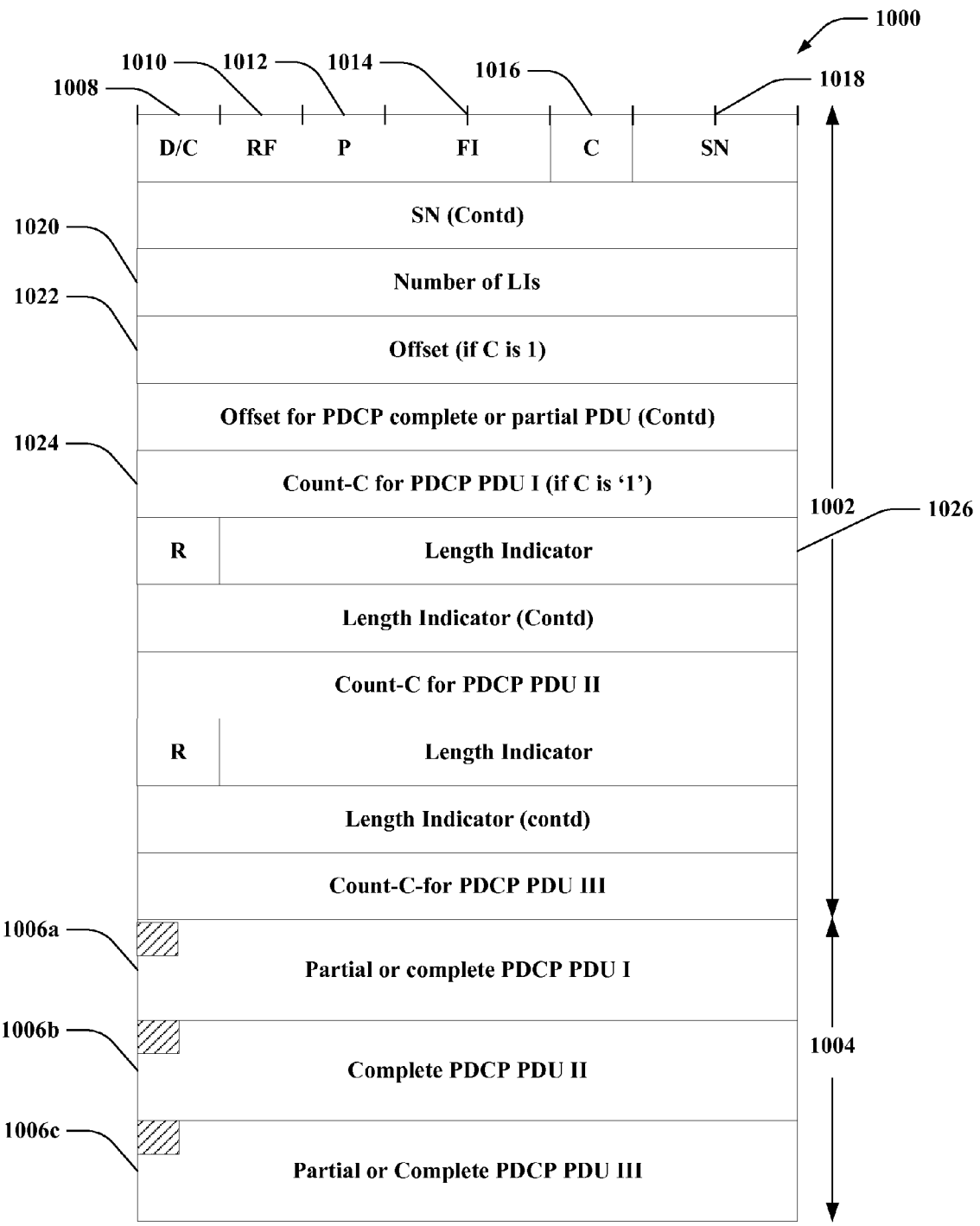
FIG. 10 is a conceptual diagram illustrating another example of an RLC PDU.

FIG. 10 is a conceptual diagram illustrating another example of an RLC PDU. This example is similar to that described in connection with FIG. 9. An RLC PDU 1000 includes an RLC header 1002 and an RLC payload 1004. The RLC payload 1004 includes a first partial or complete RLC SDU 1006a, a second complete RLC SDU 1006b, and a third partial or complete RLC SDU 1006c. The RLC header 1002 also includes a D/C field 1008, an RF field 1010, a P field 1012, a C field 1016, and the SN 1018 for the first SDU in the payload 1004. Similar to the RLC PDU described in connection with FIG. 10, the C field 1016 is set when the SDUs 1006 in the RLC payload 1004 are ciphered. If the C field 1016 is set, the offset 1022 and the C-Count 1024 are also included in the RLC header 1002 for the first SDU 1006 in the RLC payload 1004. The primary difference is that the RLC header 1002 in this example uses an LI number field 1020 instead of multiple E fields. The LI number field 1020 is used to indicate the number LI fields 1026 in the header 1002. The number of LI fields is equal to the number of RLC SDUs 1006 minus one.

Various modifications to the PDCP and RLC PDUs will be apparent to those skilled in the art. By way of example, the PDCP LI fields may also be ciphered, so that the PDCP ciphering offset can start from beginning or after a fixed header (e.g., after the PDCP SN). In one configuration, the receiver may use the Count-C 1024 to compute the SN 1018, thereby eliminating the need for the SN 1018 in the RLC header 1002. In addition, the offset 1022 may be omitted if the FI field 1014 indicates the start of the RLC SDU.

Figure 11:
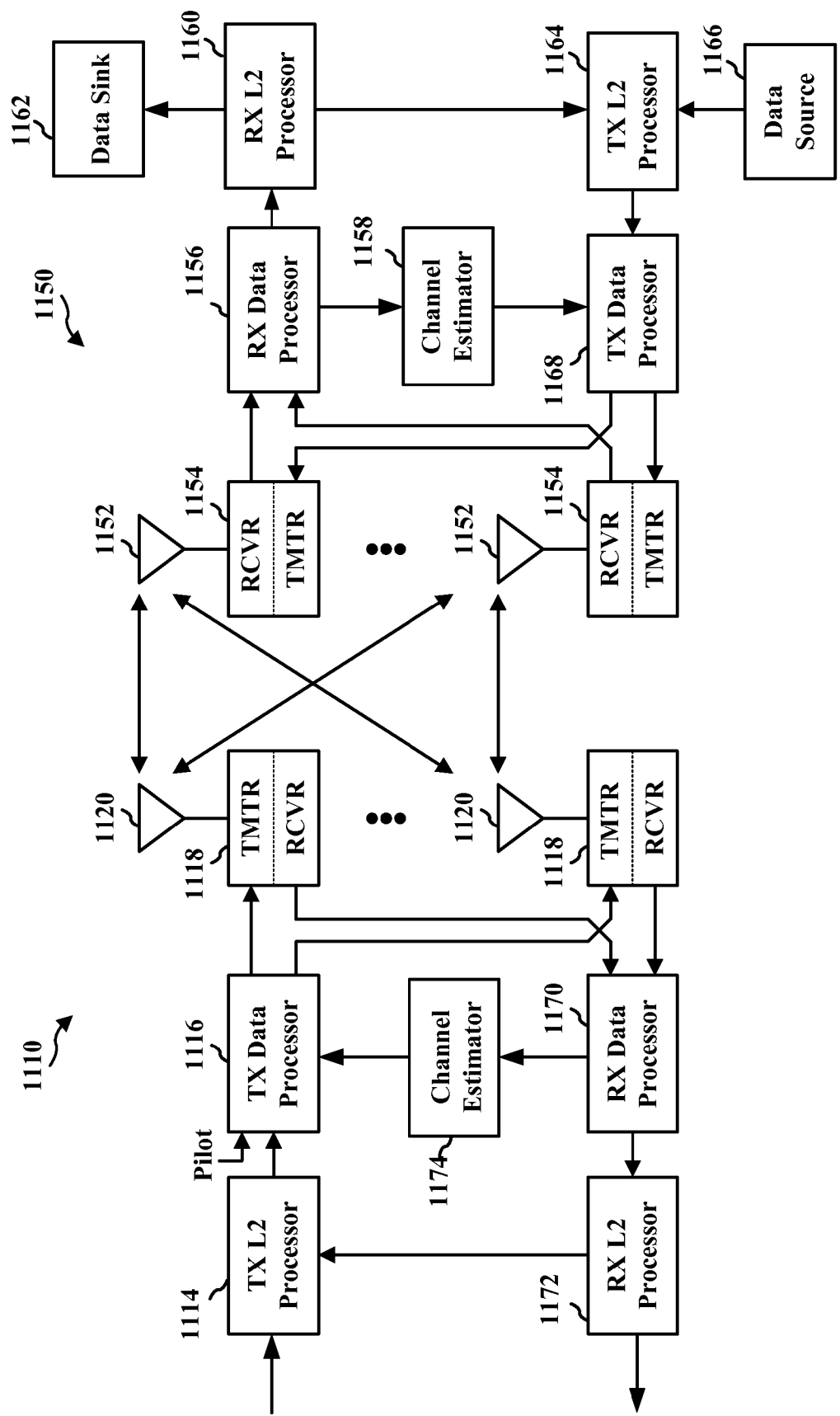
FIG. 11 is a conceptual diagram illustrating an example of an eNodeB and UE in an access network.

FIG. 11 is a block diagram of a eNodeB in communication with a UE in an access network. In the downlink, upper layer packets from the core network are provided to a transmit (TX) L2 processor 1114. The TX L2 processor 1114 implements the functionality of the L2 layer described earlier in connection with FIG. 4. More specifically, the TX L2 processor 1114 compresses the headers of the upper layer packets, ciphers the packets, segments the ciphered packets, reorders the segmented packets, multiplexes the data packets between logical and transport channels, and allocates radio resources to the UE 1150 based on various priority metrics.

The TX L2 processor 1114 is also responsible for HARQ operations, retransmission of lost packets, and signaling to the UE 1150.

The TX data processor 1116 implements various signal processing functions for the physical layer. The signal processing functions includes coding and interleaving the data to facilitate forward error correction (FEC) at the UE 1150 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated data is then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 1174 may be used to determine the coding and modulation scheme, as well as for spatial processing. The channel estimate may be derived from a reference signal and/or channel condition feedback transmitted by the UE 1150. Each spatial stream is then provided to a different antenna 1120 via a separate transmitter 1118TX. Each transmitter 1118TX modulates an RF carrier with a respective spatial stream for transmission.

At the UE 1150, each receiver 1154RX receives a signal through its respective antenna 1152. Each receiver 1154RX recovers information modulated onto an RF carrier and provides the information to the receiver (RX) data processor 1156.

The RX data processor 1156 implements various signal processing functions of the physical layer. The RX data processor 1156 performs spatial processing on the information to recover any spatial streams destined for the UE 1150. If multiple spatial streams are destined for the UE 1150, they may be combined by the RX data processor 1156 into a single OFDM symbol stream. The RX data processor 1156 then converts the OFDM symbol stream from the time-domain to the frequency domain using a Fast Fourier Transform (FFT). The frequency domain signal comprises a separate OFDM symbol stream for each subcarrier of the OFDM signal. The data on each subcarrier, and the reference signal, is recovered and demodulated by determining the most likely signal constellation points transmitted by the eNodeB 1110. These soft decisions may be based on channel estimates computed by the channel estimator 1158. The soft decisions are then decoded and deinterleaved to recover the data packets that were originally transmitted by the eNodeB 1110 on the physical channel. The recovered data packets are then provided to a RX L2 processor 1160.

The RX L2 processor 1160 implements the functionality of the L2 layer described earlier in connection with FIG. 4. More specifically, the RX L2 processor 1160 demultiplexes the data packets between transport and logical channels, reassembles the data packets into upper layer packets, deciphers the upper layer packets, and decompresses the headers. The upper layer packets are then provided to a data sink 1162, which represents all the protocol layers above the L2 layer. The RX L2 processor 1160 is also responsible for error detection using an acknowledgement (ACK) and/or negative acknowledgement (NACK) protocol to support HARQ operations.

In the uplink, a data source 1166 is used to provide data packets to a transmit (TX) L2 processor 1164. The data source 1166 represents all protocol layers above the L2 layer (L2). Similar to the functionality described in connection with the downlink transmission by the eNodeB 1110, the TX L2 processor 1164 implements the L2 layer and the TX data processor 1168 implements the physical layer. Channel estimates derived by a channel estimator 1158 from a reference signal or feedback transmitted by the eNodeB 1110 may be used by the TX data processor 1168 to select the appropriate coding and modulation schemes, and to facilitate spatial processing. The spatial streams generated by the TX data processor 1168 are provided to different antenna 1152 via separate transmitters 1154TX. Each transmitter 1154TX modulates an RF carrier with a respective spatial stream for transmission.

The uplink transmission is processed at the eNodeB 1110 in a manner similar to that described in connection with the receiver function at the UE 1150. Each receiver 1118RX receives a signal through its respective antenna 1120. Each receiver 1118RX recovers information modulated onto an RF carrier and provides the information to a RX data processor 1170. The RX data processor 1170 implements the physical layer and the RX L2 processor 1172 implements the L2 layer. Upper layer packets from the RX L2 processor may be provided to the core network.

Figure 12:
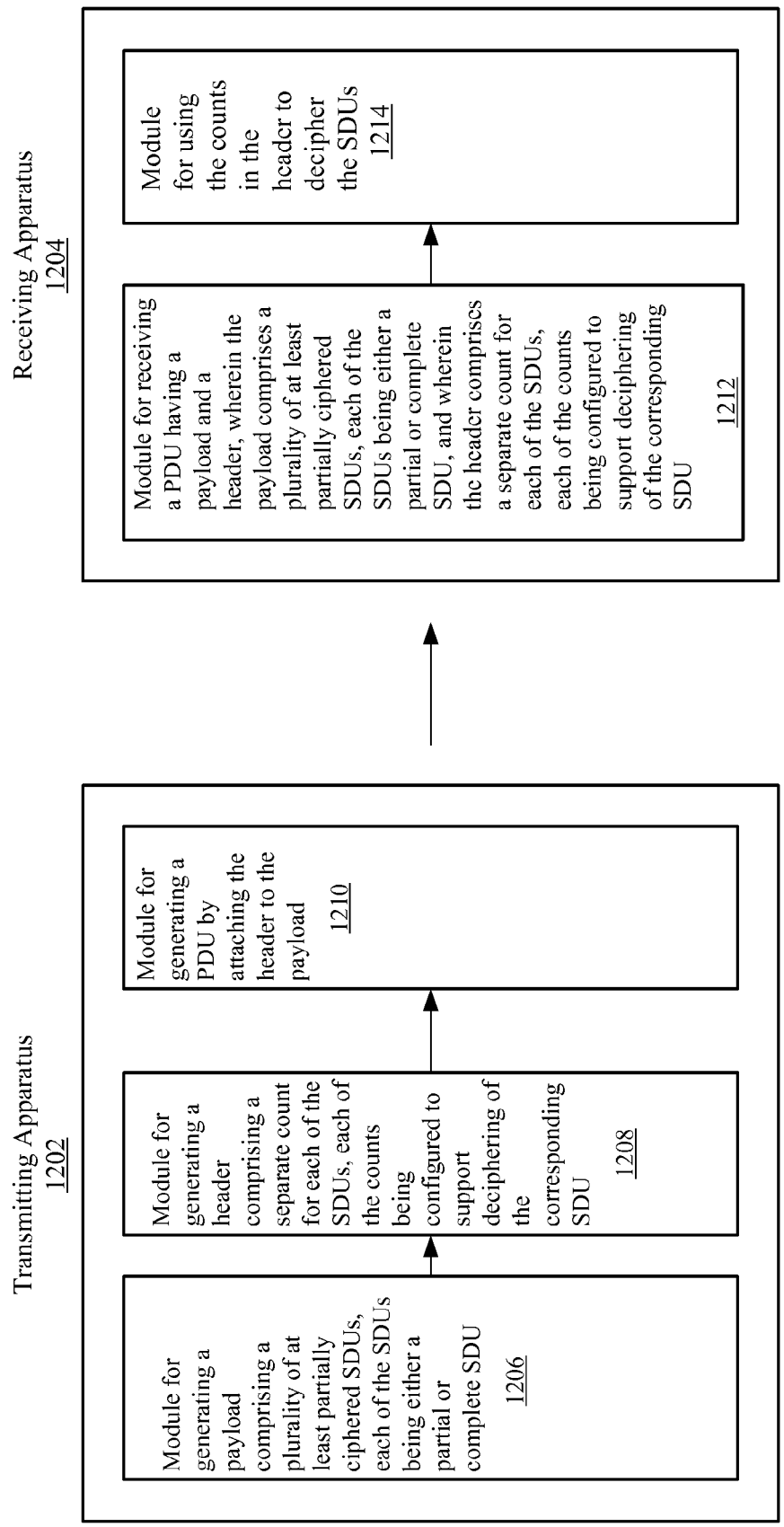
FIG. 12 is a functional block diagram illustrating an example of a transmitting apparatus in communication with a receiving apparatus.

FIG. 12 is a functional block diagram illustrating an example of a transmitting apparatus in communication with a receiving apparatus. The transmitting apparatus 1202 may be an eNodeB and the receiving apparatus 1204 may be a UE. Alternatively, the transmitting apparatus 1202 may be a UE and the receiving apparatus 1204 may be an eNodeB.

The transmitting apparatus 1202 includes a module 1206 for generating a payload comprising a plurality of at least partially ciphered SDUs, each of the SDUs being either a partial or complete SDU. The transmitting apparatus 1202 also includes a module 1208 for generating a header comprising a separate count for each of the SDUs, each of the counts being configured to support deciphering of the corresponding SDU. The transmitting apparatus 1202 further includes module 1210 for generating a PDU by attaching the header to the payload. These modules may be implemented with the L2 processor or by some other means.

The receiving apparatus 1204 includes a module 1212 for receiving a PDU having a payload and a header, wherein the payload comprises a plurality of at least partially ciphered SDUs, each of the SDUs being either a partial or complete SDU, and wherein the header comprises a separate count for each of the SDUs, each of the counts being configured to support deciphering of the corresponding SDU. The receiving apparatus 1204 also includes a module 1214 for using the counts in the header to decipher the SDUs. These modules may be implemented with the L2 processor or by some other means.

Figure 13:
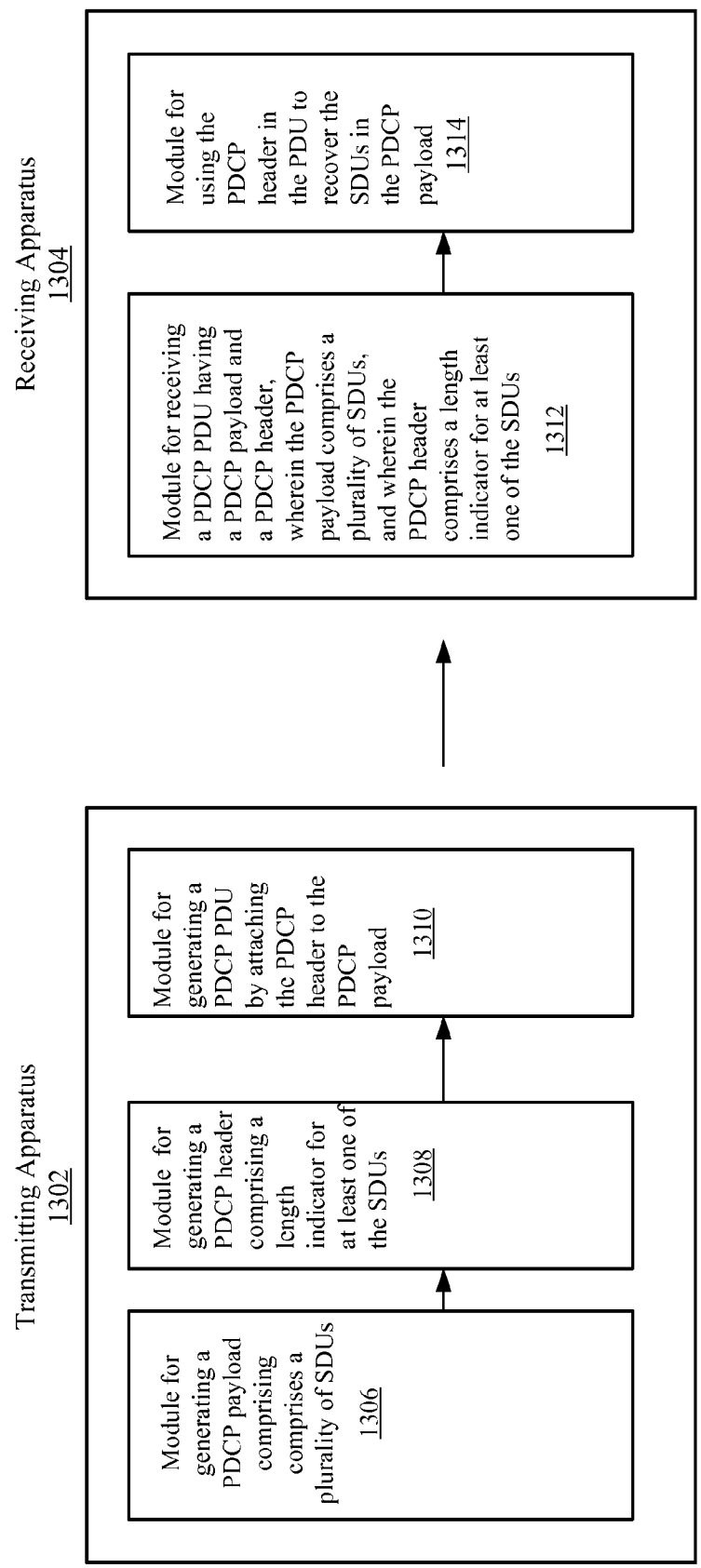
FIG. 13 is a functional block diagram illustrating another example of a transmitting apparatus in communication with a receiving apparatus.

FIG. 13 is a functional block diagram illustrating another example of a transmitting apparatus in communication with a receiving apparatus. Similar to FIG. 12, the transmitting apparatus 1302 may be an eNodeB and the receiving apparatus 1304 may be a UE. Alternatively, the transmitting apparatus 1302 may be a UE and the receiving apparatus 1304 may be an eNodeB.

The transmitting apparatus 1302 includes a module 1306 for generating a PDCP payload comprising comprises a plurality of SDUs. The transmitting apparatus 1302 also includes a module 1308 for generating a PDCP header comprising a length indicator for at least one of the SDUs. The transmitting apparatus 1302 further includes module 1310 for generating a PDCP PDU by attaching the PDCP header to the PDCP payload. These modules may be implemented with the L2 processor or by some other means.

The receiving apparatus 1304 includes a module 1312 for receiving a PDCP PDU having a PDCP payload and a PDCP header, wherein the PDCP payload comprises a plurality of SDUs, and wherein the PDCP header comprises a length indicator for at least one of the SDUs. The receiving apparatus 1304 also includes a module 1314 for using the PDCP header in the PDU to recover the SDUs in the PDCP payload. These modules may be implemented with the L2 processor or by some other means.

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. An apparatus for wireless communications, comprising:
   a memory; and
   a processor coupled to the memory and configured to:
      receive a protocol data unit (PDU) having a payload and a header, wherein the payload comprises a plurality of at least partially ciphered service data units (SDUs), each of the plurality of at least partially ciphered SDUs being either a partial or complete SDU, and wherein the header comprises a plurality of separate counts, each of the plurality of separate counts being for a corresponding one of the plurality of at least partially ciphered SDUs and being configured to support deciphering of the corresponding one of the plurality of at least partially ciphered SDUs; and
      decipher the plurality of at least partially ciphered SDUs based on the plurality of separate counts.

2. The apparatus of claim 1 wherein the PDU is a radio link control (RLC) PDU, the header is an RLC header, and each of the plurality of at least partially ciphered SDUs is a packet data convergence protocol (PDCP) PDU.

3. The apparatus of claim 1 wherein each of the plurality of separate counts comprises a hyper-frame number and a sequence number for the corresponding one of the plurality of at least partially ciphered SDUs.

4. The apparatus of claim 1 wherein the header comprises a separate offset for at least each of the plurality of at least partially ciphered SDUs, the separate offset being configured to support deciphering of the corresponding one of the plurality of at least partially ciphered SDUs.

5. The apparatus of claim 4 wherein the separate offset for each of the plurality of at least partially ciphered SDUs is related to a segmentation of the plurality of at least partially ciphered SDUs between the PDU and at least another PDU.

6. The apparatus of claim 1 wherein the header further comprises an indication that the plurality of at least partially ciphered SDUs are ciphered and that each of the plurality of separate counts corresponding to each of the plurality of at least partially ciphered SDUs is included in the header.

7. The apparatus of claim 1 wherein the header further comprises a length indicator for at least one of the plurality of at least partially ciphered SDUs.

8. The apparatus of claim 7 wherein the header further comprises an indication for the length indicator for the at least one of the plurality of at least partially ciphered SDUs in the header.

9. The apparatus of claim 7 wherein the header further comprises an indication of a number of the length indicators in the header.

10. The apparatus of claim 1 wherein the header comprises a sequence number for only one of the plurality of at least partially ciphered SDUs in the payload.

11. The apparatus of claim 1 wherein the generating of the PDU comprises ciphering the plurality of at least partially ciphered SDUs, generating the header, and attaching the header to the plurality of at least partially ciphered SDUs.

12. The apparatus of claim 1 wherein the extracting of data from the PDU comprises using the plurality of separate counts in the header to decipher the plurality of at least partially ciphered SDUs, such that the plurality of separate counts are configured to provide information to decipher the plurality of at least partially ciphered SDUs.

13. An apparatus for wireless communications, comprising:
   a memory; and
   a processor coupled to the memory and configured to:
      receive a packet data convergence protocol (PDCP) protocol data unit (PDU) having a PDCP payload and a PDCP header, wherein the PDCP payload comprises a plurality of service data units (SDUs), wherein the PDCP header comprises a length indicator for at least one of the plurality of SDUs, and wherein the PDCP header comprises a plurality of separate counts, each of the plurality of separate counts being for a corresponding one of the plurality of SDUs and being configured to support deciphering of the corresponding one of the plurality of SDUs; and
      decipher the plurality of SDUs based on the plurality of separate counts.

14. The apparatus of claim 13 wherein each of the plurality of SDUs is an IP packet.

15. The apparatus of claim 13 wherein the PDCP header further comprises an indication for each length indicator in the PDCP header.

16. The apparatus of claim 13 wherein the PDCP header further comprises an indication of a number of the length indicators in the PDCP header.

17. The apparatus of claim 13 wherein the PDCP header comprises a sequence number for only one of the SDUs in the PDCP payload.

18. The apparatus of claim 13 wherein the generating of the PDU comprises ciphering at least a portion of each of the plurality of SDUs, generating the PDCP header, and attaching the PDCP header to the plurality of SDUs.

19. The apparatus of claim 13 wherein the extracting of data from the PDU comprises using the PDCP header in the PDU to recover the plurality of SDUs in the PDCP payload.

20. An apparatus for wireless communication, comprising:
a memory; and
a processor coupled to the memory and configured to:
receive an radio link control (RLC) protocol data unit (PDU) having an RLC payload and an RLC header, wherein the RLC payload comprises a plurality of at least partially ciphered packet data convergence protocol (PDCP) PDUs, each of the plurality of at least partially ciphered PDCP PDUs being either a partial or complete PDCP PDU, wherein the RLC header comprises:
a sequence number for at least one of the plurality of at least partially ciphered PDCP PDUs;
a separate offset for at least each of the partial PDCP PDUs, each offset being configured to support deciphering of a corresponding PDCP PDU, wherein the offset for each of the partial PDCP PDUs is related to a segmentation of the partial PDCP PDU between the RLC PDU and at least another RLC PDU;
a separate count for each of the plurality of at least partially ciphered PDCP PDUs, each count being configured to support deciphering of a corresponding PDCP PDU, wherein each count comprises a hyper-frame number and a sequence number for the corresponding PDCP PDU;
an indication that the plurality of at least partially ciphered PDCP PDUs are ciphered and that the count for each of the plurality of at least partially ciphered PDCP PDUs is included in the RLC header; and
a length indicator for at least one of the plurality of at least partially ciphered PDCP PDUs; and
decipher each of the plurality of at least partially ciphered PDCP PDUs based on a corresponding separate count.

21. The apparatus of claim 20 wherein the RLC header further comprises an indication of a number of the length indicators in the RLC header.

22. The apparatus of claim 20 wherein the RLC header further comprises an indication for each length indicator in the RLC header.

23. An apparatus for wireless communications, comprising:
means for generating a payload comprising a plurality of at least partially ciphered service data units (SDUs), each of the plurality of at least partially ciphered SDUs being either a partial or complete SDU;
means for generating a header comprising a plurality of separate counts, each of the separate counts being for a corresponding one of the plurality of at least partially ciphered SDUs and being configured to support deciphering of the corresponding one of the plurality of at least partially ciphered SDUs;
means for generating a protocol data unit (PDU) by attaching the header to the payload; and
means for transmitting the PDU.

24. An apparatus for wireless communications, comprising:
means for receiving a protocol data unit (PDU) having a payload and a header, wherein the payload comprises a plurality of at least partially ciphered service data units (SDUs), each of the plurality of at least partially ciphered SDUs being either a partial or complete SDU, and wherein the header comprises a plurality of separate counts, each of the plurality of separate counts being for a corresponding one of the plurality of at least partially ciphered SDUs and being configured to support deciphering of the corresponding one of the plurality of at least partially ciphered SDUs; and
means for deciphering the plurality of at least partially ciphered SDUs based on the plurality of separate counts.

25. A method for wireless communications, comprising:
generating a payload comprising a plurality of at least partially ciphered service data units (SDUs), each of the plurality of at least partially ciphered SDUs being either a partial or complete SDU;
generating a header comprising a plurality of separate counts, each of the separate counts being for a corresponding one of the plurality of at least partially ciphered SDUs and being configured to support deciphering of the corresponding one of the plurality of at least partially ciphered SDU;
generating a protocol data unit (PDU) by attaching the header to the payload; and
transmitting the PDU, wherein the plurality of at least partially ciphered SDUs included in the PDU is to be deciphered based on the plurality of separate counts.

26. A non-transitory computer readable medium storing computer executable code for wireless communication, comprising code for:
receiving a protocol data unit (PDU) having a payload and a header, wherein the payload comprises a plurality of at least partially ciphered service data units (SDUs), each of the plurality of at least partially ciphered SDUs being either a partial or complete SDU, and wherein the header comprises a plurality of separate counts, each of the plurality of separate counts being for a corresponding one of the plurality of at least partially ciphered SDUs and being configured to support deciphering of the corresponding one of the plurality of at least partially ciphered SDUs; and
deciphering the plurality of at least partially ciphered SDUs based on the plurality of separate counts.

27. A method for wireless communications, comprising:
receiving a protocol data unit (PDU) having a payload and a header, wherein the payload comprises a plurality of at least partially ciphered service data units (SDUs), each of the plurality of at least partially ciphered SDUs being either a partial or complete SDU, and wherein the header comprises a plurality of separate counts, each of the plurality of separate counts being for a corresponding one of the plurality of at least partially ciphered SDUs and being configured to support deciphering of the corresponding one of the plurality of at least partially ciphered SDUs; and
deciphering the plurality of at least partially ciphered SDUs based on the plurality of separate counts.

28. A method for wireless communications, comprising:
receiving a packet data convergence protocol (PDCP) protocol data unit (PDU) having a PDCP payload and a PDCP header, wherein the PDCP payload comprises a plurality of service data units (SDUs), wherein the PDCP header comprises a length indicator for at least one of the plurality of SDUs, and wherein the PDCP header comprises a plurality of separate counts, each of the plurality of separate counts being for a corresponding one of the plurality of SDUs and being configured to support deciphering of the corresponding one of the plurality of SDUs; and deciphering the plurality of SDUs based on the plurality of separate counts.

29. An apparatus for wireless communications, comprising:

means for receiving a packet data convergence protocol (PDCP) protocol data unit (PDU) having a PDCP payload and a PDCP header, wherein the PDCP payload comprises a plurality of service data units (SDUs), wherein the PDCP header comprises a length indicator for at least one of the plurality of SDUs, and wherein the PDCP header comprises a plurality of separate counts, each of the plurality of separate counts being for a corresponding one of the plurality of SDUs and being configured to support deciphering of the corresponding one of the plurality of SDUs; and means for deciphering the plurality of SDUs based on the plurality of separate counts.

30. A non-transitory computer readable medium storing computer executable code for wireless communication, comprising code for:

receiving a packet data convergence protocol (PDCP) protocol data unit (PDU) having a PDCP payload and a PDCP header, wherein the PDCP payload comprises a plurality of service data units (SDUs), wherein the PDCP header comprises a length indicator for at least one of the plurality of SDUs, and wherein the PDCP header comprises a plurality of separate counts, each of the plurality of separate counts being for a corresponding one of the plurality of SDUs and being configured to support deciphering of the corresponding one of the plurality of SDUs; and deciphering the plurality of SDUs based on the plurality of separate counts.

31. A method for wireless communications, comprising:

receiving a radio link control (RLC) protocol data unit (PDU) having an RLC payload and an RLC header, wherein the RLC payload comprises a plurality of at least partially ciphered packet data convergence protocol (PDCP) PDUs, each of the plurality of at least partially ciphered PDCP PDUs being either a partial or complete PDCP PDU, wherein the RLC header comprises:

a sequence number for at least one of the plurality of at least partially ciphered PDCP PDUs;

a separate offset for at least each of the partial PDCP PDUs, each offset being configured to support deciphering of a corresponding PDCP PDU, wherein the offset for each of the partial PDCP PDUs is related to a segmentation of the partial PDCP PDU between the RLC PDU and at least another RLC PDU;

a separate count for each of the plurality of at least partially ciphered PDCP PDUs, each count being configured to support deciphering of a corresponding PDCP PDU, wherein each count comprises a hyperframe number and a sequence number for the corresponding PDCP PDU;

an indication that the plurality of at least partially ciphered PDCP PDUs are ciphered and that the count for each of the plurality of at least partially ciphered PDCP PDUs is included in the RLC header; and a length indicator for at least one of the plurality of at least partially ciphered PDCP PDUs; and deciphering each of the plurality of at least partially ciphered PDCP PDUs based on a corresponding separate count.

32. An apparatus for wireless communications, comprising:

means for processing a radio link control (RLC) protocol data unit (PDU) having an RLC payload and an RLC header, the processing of the RLC PDU includes generating the RLC PDU for transmission or extracting data from the RLC PDU, wherein the RLC payload comprises a plurality of at least partially ciphered packet data convergence protocol (PDCP) PDUs, each of the plurality of at least partially ciphered PDCP PDUs being either a partial or complete PDCP PDU, and wherein the RLC header comprises:

a sequence number for at least one of the plurality of at least partially ciphered PDCP PDUs;

a separate offset for at least each of the partial PDCP PDUs, each offset being configured to support deciphering of a corresponding PDCP PDU, wherein the offset for each of the partial PDCP PDUs is related to a segmentation of the partial PDCP PDU between the RLC PDU and at least another RLC PDU;

a separate count for each of the plurality of at least partially ciphered PDCP PDUs, each count being configured to support deciphering of a corresponding PDCP PDU, wherein each count comprises a hyperframe number and a sequence number for the corresponding PDCP PDU;

an indication that the plurality of at least partially ciphered PDCP PDUs are ciphered and that the count for each of the plurality of at least partially ciphered PDCP PDUs is included in the RLC header; and a length indicator for at least one of the plurality of at least partially ciphered PDCP PDUs.

33. A non-transitory computer readable medium storing computer executable code for wireless communication, comprising code for:

receiving a radio link control (RLC) protocol data unit (PDU) having an RLC payload and an RLC header, wherein the RLC payload comprises a plurality of at least partially ciphered packet data convergence protocol (PDCP) PDUs, each of the plurality of at least partially ciphered PDCP PDUs being either a partial or complete PDCP PDU, wherein the RLC header comprises:

a sequence number for at least one of the plurality of at least partially ciphered PDCP PDUs;

a separate offset for at least each of the partial PDCP PDUs, each offset being configured to support deciphering of a corresponding PDCP PDU, wherein the offset for each of the partial PDCP PDUs is related to a segmentation of the partial PDCP PDU between the RLC PDU and at least another RLC PDU;

a separate count for each of the plurality of at least partially ciphered PDCP PDUs, each count being configured to support deciphering of a corresponding PDCP PDU, wherein each count comprises a hyperframe number and a sequence number for the corresponding PDCP PDU;

an indication that the plurality of at least partially ciphered PDCP PDUs are ciphered and that the count for each of the plurality of at least partially ciphered PDCP PDUs is included in the RLC header; and a length indicator for at least one of the plurality of at least partially ciphered PDCP PDUs; and deciphering each of the plurality of at least partially ciphered PDCP PDUs based on a corresponding separate count.

\* \* \* \* \*